No. 765,933. PATENTED JULY 26, 1904.
G. A. NOWLAND.
HAWSE PIPE.
APPLICATION FILED MAR. 28, 1904.
NO MODEL.
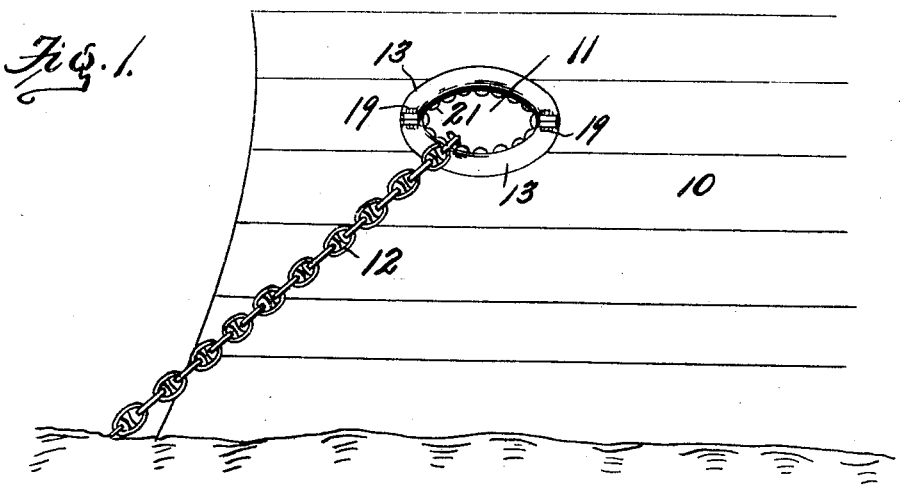
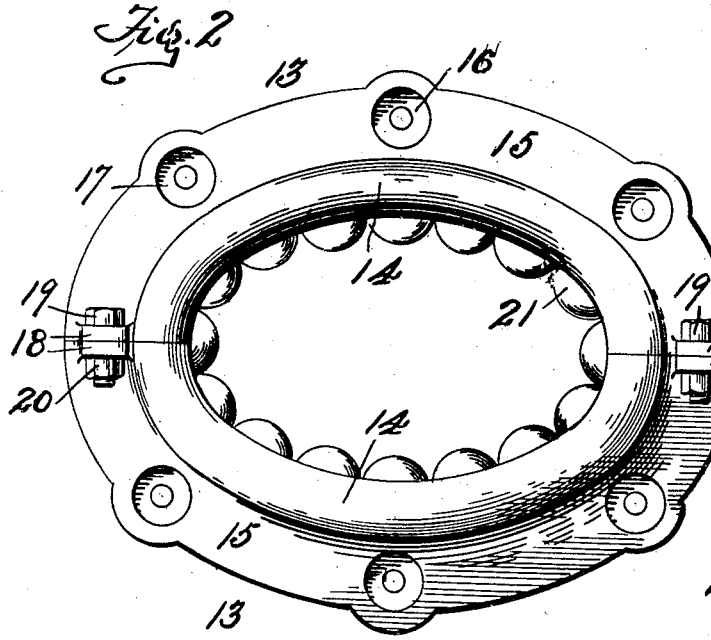
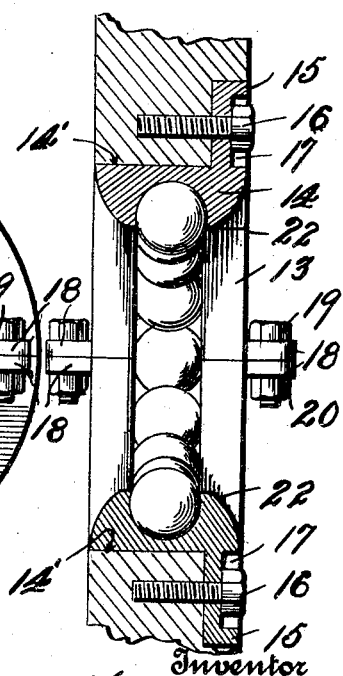
Witnesses
Chas. K. Davis
Chas. S. Mason
Inventor
George A. Nowland,
by F. E. Stebbins
Attorney No. 765,933.

Patented July 26, 1904.

UNITED STATES PATENT OFFICE.

GEORGE A. NOWLAND, OF ALEXANDRIA, VIRGINIA, ASSIGNOR OF ONE-HALF TO AUGUSTUS H. AGNEW, OF ALEXANDRIA, VIRGINIA.

HAWSE-PIPE.

SPECIFICATION forming part of Letters Patent No. 765,933, dated July 26, 1904.

Application filed March 28, 1904. Serial No. 200,458. (No model.)

*To all whom it may concern:*

Be it known that I, GEORGE A. NOWLAND, a citizen of the United States, residing at Alexandria, in the county of Alexandria and State of Virginia, have invented new and useful Improvements in Hawse-Pipes, of which the following is a specification.

My invention relates to improvements in hawse-pipes for vessels, through which pass anchor-chains and cables; and it consists of a housing or sectional casting secured to the vessel and provided with a groove for loosely retaining a series of balls, which serve as antifriction elements for the chain or cable.

The accompanying drawings, which form a part of this specification, illustrate an example of the physical embodiment of the invention constructed according to the best mode I have so far devised for the practical application of the principle.

Figure 1 shows in side elevation the bow of a vessel provided with a hawse-pipe embodying my improvements. Fig. 2 is a view in elevation of the device on an enlarged scale. Fig. 3 is an enlarged vertical sectional view of Fig. 1, taken through the hawse-pipe and the wall of the vessel adjacent thereunto.

Referring to the several figures of the drawings, the numeral 10 designates the side of a vessel having an opening or port 11 in its bow, through which a cable or anchor-chain 12 is adapted to slide. The hawse-pipe is formed of two similar sections 13 13, each having a semi-elliptical body portion 14 and a rounded or curved inner edge 22. A plane outer edge 14' and said body portion are provided with an outward-extending rim or flange 15. The edge 14 is adapted to contact with the wall of the opening or port 11 and the flange 15 to be seated in a recessed portion of the side 10 of the vessel adjacent the said port 11 and to be secured to said side by the threaded bolts or screws 16, which have their heads countersunk in the recesses 17 in said flange, so as to be substantially flush with the face thereof, thus avoiding engagement with any outside interfering obstacle.

At each end and on both the faces of the flange 15 of each section 13 is a lug 18, whereby when the sections are in place in the port their abutting ends may be firmly secured together by means of the threaded bolts 19, which have their shanks passed through said lugs and having tightening or clamping nuts 20 thereon. Located in the groove formed in the rounded face 22 of the body portion of each section are antifriction-balls 21, the said balls having a little more than half their external surface within the groove in the castings, the adjacent or contact edge of the section curving outside and extending beyond the major portion of the balls, so as to securely hold the said balls in place and prevent their displacement. These antifriction-balls 21 are preferably placed close to each other around the entire inner edge of the pipe, so that a chain in passing through the pipe will bear upon several balls at the same time, thus distributing the wear and the strain upon them. The balls may be formed of any suitable metal, as is obvious. The castings are similar in form or shape and can be reversed in position or interchanged, if desired, so that when the lower one, which usually is subjected to the greatest wear, becomes too much worn the upper one may be substituted in the place thereof, and thereby the durability and life of the device as a whole be increased.

The sections 13 13 are preferably cast to shape; but other suitable material may be used, if so desired. If one of the sections should become broken, a new one can readily be substituted, as is obvious.

It will be seen that the antifriction-balls 21, which will roll freely in the groove, form a bearing for an anchor-chain or cable, allowing the same to run freely and also prevent any excessive strains on the hawse-pipe itself.

While I have illustrated but one example of the physical embodiment of my invention, I do not thereby intend to limit its scope, inasmuch as the principle may be embodied in other forms and constructions without constituting substantial departures.

What I claim as new, and desire to secure by Letters Patent, is—

1. A hawse-pipe comprising similar sections each having a body portion and a flanged rim, means for connecting said sections and means for securing said sections to the wall of the port, said pipe being provided with a series of antifriction-balls.

2. The combination with a vessel, of a hawse-pipe comprising similar sections each having a body portion and a flanged rim, and antifriction-balls located in a groove in said body portion.

3. A hawse-pipe comprising interchangeable sections each having a body portion with a groove therein and provided with a flanged rim, antifriction-balls in said groove, and recesses in said rim for securing-bolts, substantially as described.

4. A hawse-pipe comprising interchangeable sections, each having a body portion with a groove therein and a flanged rim antifriction-balls freely held in said groove and said flanged rim having recesses therein for fastening means, and lugs on the ends of said sections for securing them together, said parts being combined substantially as described.

5. The combination with a vessel having a port therein, of a hawse-pipe consisting of a casting set in the wall of the vessel and provided with a series of antifriction-balls adapted to be engaged by an anchor-chain or cable, substantially as described.

In testimony whereof I affix my signature in presence of two witnesses.

GEORGE A. NOWLAND.

Witnesses:
 KATE W. FLOOD,
 A. K. STRATTON.